United States Patent [19]

Bethshears

[11] Patent Number: 4,828,829

[45] Date of Patent: May 9, 1989

[54] FISH ATTRACTANT WITH SENSORY ENHANCEMENTS

[75] Inventor: William D. Bethshears, Bruceton, Tenn.

[73] Assignee: Flow-Rite of Tennessee, Inc., Bruceton, Tenn.

[21] Appl. No.: 158,383

[22] Filed: Feb. 22, 1988

[51] Int. Cl.⁴ ............................................ A01N 25/00
[52] U.S. Cl. ......................................................... 424/84
[58] Field of Search ................ 424/84; 43/42.06, 17.5, 43/17.0; 426/1

[56] References Cited

U.S. PATENT DOCUMENTS

| | | | |
|---|---|---|---|
| 564,834 | 7/1896 | Pflueger | 43/17.6 |
| 1,045,715 | 0/0000 | Mack et al. | 48/192 |
| 1,817,694 | 8/1931 | Lafky | 43/17.6 |
| 2,449,322 | 0/0000 | Richardson | 426/1 |
| 2,452,552 | 11/1948 | Curtis et al. | 426/1 |
| 2,849,981 | 9/1958 | Rose et al. | 119/1 |
| 2,874,048 | 2/1959 | Walldou | 43/42.06 |
| 3,918,190 | 11/1975 | Hornbeck | 43/4.5 |
| 4,445,178 | 4/1984 | Scheer et al. | 364/400 |
| 4,486,460 | 12/1984 | Kienast et al. | 427/4 |
| 4,693,028 | 9/1987 | Hill | 43/4.5 |
| 4,732,766 | 3/1988 | Lindgard | 426/1 |
| 4,736,542 | 4/1988 | Floyd | 43/42.06 |

FOREIGN PATENT DOCUMENTS 587017  11/1959  Canada ............... 43/42.06

Primary Examiner—Douglas W. Robinson
Assistant Examiner—Roger Gobrogge
Attorney, Agent, or Firm—Niro, Scavone, Haller & Niro, Ltd.

[57] ABSTRACT

A visual fish attractant that visually attracts fish and aids in the dispersion of traditional scent and taste attractants is disclosed. The fish attractant compositions, if oil based, include one or more oils, such as mineral oil, cod liver oil, menhaden oil, herring oil, anise oil, salmon oil, as well as pigments, fragrances, fish scent, dispersed pigments, and light-reflective particles that act both as a visual attractant and as an aid to controlled dispersion of the oil and scent components.

6 Claims, No Drawings

FISH ATTRACTANT WITH SENSORY ENHANCEMENTS

BACKGROUND OF THE INVENTION

This invention relates to fish attractants and, more particularly, to novel visual fish attractants that both visually attract fish and aid in the dispersion of traditional scent and taste attractants.

Various oil and water based fish attractants have been formulated and used as a means to attract fish and enhance the ability of both competitive and non-competitive fishing enthusiasts to attract and catch various species of fish. Such specialty formulations have been made for salt water and fresh water fish, and, in some instances, have attempted to simulate the taste and scent of such commonly used natural bait as crawfish, shad and shrimp. Typically, such formulations are in paste or liquid forms and are sprayed or otherwise applied onto lures or live bait. Other attractants have been made in solid form and are physically attached to the fishing line adjacent to the lure. Although such commonly used fish attractants have successfully capitalized on the scent and taste senses of fish, none has been capable of attracting fish by appealing to visual, scent and taste senses simultaneously. Nor has any commonly used fish attractant been easily dispersed in a controlled fashion.

SUMMARY OF THE INVENTION

The present invention provides a fish attractant composition that aids the visual impact of a bait by furnishing a natural visual discharge appearance similar to the colorful oil and scale discharge of active, live bait. In addition, the visual fish attractant composition of the present invention acts to improve the dispersibility of traditional fish attractants in water, so that the combined formulation can be dispersed and discharged in a controlled fashion, resembling the visual appearance of the reflective scales and particles that come off a live bait.

In a preferred embodiment of the present invention, tiny precision-cut polyester foil particles are incorporated in an oil based fish attractant that includes one or more components, such as mineral oil, crawfish pigments, cod liver oil, herring oil, menhaden oil, anise oil, salmon oil, natural fish oils and various other scent and color attractant materials. The ultra thin, micro-size particles act as an aid to controlled dispersion of the oil components, thus improving the spreading of oil, scents and taste attractant components to game fish. Specifically, the more dense particles, when combined with more buoyant oils, act in combination to slow the combined particles and oil from leaving the fish "strike zone" too quickly. In sum, the discharge of oils, pigment, scent attractant and particles rise to the surface more slowly. In addition, the involvement of the three senses of sight, scent and taste enhances the life-like character of both natural and artificial baits that have been coated with the compositions of the present invention.

In a particularly preferred embodiment of the present invention, the fish attractant composition includes dispersed light-reflective particles that are slightly buoyant in water when coated with an oil-based fish attractant, so that when discharged from the live or artificial bait, the particles will remain at the bait level in the water or slowly rise towards the surface. This floating and rising action of the light reflective particles presents a visual enhancement in addition to carrying the scent and taste attractants.

DESCRIPTION OF A PREFERRED EMBODIMENT

Fish attractant formulations include various oil based components such as mineral oil, menhaden oil, anise oil, cod liver oil, salmon oil and herring oil. Moreover, pigments and dyes, scent and taste components, and shrimp, crawfish and other live bait components can be included in the fish attractant formulation.

In addition to the above components, a highly dispersed visual attractant material can be added to the composition, typically highly reflective, metallic-colored particles made, for example, from coated aluminum foil or polyester or other thermoplastic or thermoset resin materials. As an example, a non-tarnishing gold, red or silver metallic-colored polyester material sold by Meadowbrook Inventions, Inc., under the tradename Micronic Jewels has been found to be particularly useful in the practice of the present invention. The reflective material sold by Meadowbrook comprises polyester or aluminum foils or films which are precision cut into ultra thin, extremely small particles that are non-tarnishing and solvent resistant. They are capable of withstanding temperatures of between 350° F. and 650° F. and can be readily dispersed in oil or water based fish attractant formulations. The particles are available in 50 to 200 micron size ranges. The preferred particle size is between 150 and 200 microns. A preferred shape for the 150 micron particles is 0.008×0.004×0.0005 inch. A preferred shape for the 200 micron particles is 0.008×0.008×0.0005 inch.

If the particles are too small, they tend to accumulate and join together into larger clumps. If the particles are too large, they cannot be easily discharged from conventional spray nozzles.

In one example of the present invention, 90 to 95 parts by volume of a commercial grade mineral oil is blended with 1 to 8 parts by volume of a crawfish pigment. To that blend about 0.01 to 1 part by volume of silver metallic-colored micro-sized foil particles are added. The resultant composition is mixed, bottled and then can be dispersed by spray, pumping or pouring on a live bait or lure.

Alternatively, the blend of mineral oil and crawfish pigment can be added to an 8 ounce bottle and then between 1 and 4 grams by weight of the light-reflective particles can be added to the 8 ounce bottle.

Once applied to the bait or lure which is then cast, plugged or otherwise placed in water, the composition slowly begins to disperse giving off a continuous, but controlled, discharge of brightly colored scale-like particles closely simulating the appearance of live bait that has been attacked by a predator fish. For this reason, gold, silver and red particles are preferred because they most closely resemble the appearance of fish scales.

As the tiny reflective particles come off the live bait or artificial lure, the oily scent and taste attractants in the composition are carried by the small light-reflective, colored particles and are particularly attractive to game fish. The breakdown of the oil based components into smaller messenger particles helps keep visual, scent and taste attractant particles in the water near a fish's location or "strike zone" for a longer time. The oil base also makes it easier for fish to detect the scent and taste components.

Oil, of course, is buoyant in water and tends to rise. The visual attractant particles used in the compositions of the present invention are more dense than water and tend to be surrounded by oil. The newly formed oil coated particles, in combination, have a greater specific gravity than oil alone and, thus, remain in the "strike zone" for a longer period of time, are more diffused and rise to the surface of water more slowly. The light-reflective particles, therefore, act not only as a visual attractant, but also act as messengers for the oil based scent components.

As a further example of another composition of the present invention, 1 to 2 parts by volume of a crawfish fragrance manufactured by Novarone Company, Fairfield, New Jersey, is blended with 75 to 80 parts by volume of mineral oil, 15 to 25 parts by volume cod liver oil and 0.05 to 0.1 parts by volume menhaden oil. To that mixture 0.01 to 1 part by volume of a gold metallic-colored micro-sized foil particles are added. The resultant composition is mixed, bottled and then can be applied to live bait or an artificial lure by spraying, pumping, pouring or some other means sufficient to coat the bait or lure. Since fish attractants are most preferably applied to the live or artificial bait by use of atomized or stream spraying devices, it is particularly preferred that the light-reflective colored particles used in the fish attractants of the present invention have a size in the range of 0.008×0.008×0.0005 inch to 0.008×0.004×0.0005 inch. Maintaining the size of the particles below 0.008×0.008×0.0005 inch ensures that the various spraying dispensers commonly used for such fish attractants will not become clogged during use.

Other suitable compositions can include anise oil, herring oil, menhaden oil, salmon oil, natural fish oils or other suitable fish attractant materials. In each instance, however, highly-reflective, metallic-colored particles are dispersed in the composition to provide the visual attractant and dispersion properties of the present invention.

In addition to oil based fish attractant compositions, water soluble or water based fish attractant compositions can also be used with the light-reflective, visual attractant particles of the present invention. For example, such well known fish attractant formulas sold under the tradenames "Berkley Strike" and "Dr. Juice," although not as advantageous as the compositions of the present invention, can also include dispersed light-reflective particles to enhance their dispersion and visual attractant qualities.

It should be understood, of course, that changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims:

What is claimed is:

1. A liquid fish attractant composition with sensory enhancements for application to a live bait or artificial lure, comprising:
   about 90-95 parts by volume of an oil-based liquid including at least one or more of mineral oil, anise oil, cod liver oil, menhaden oil, herring oil or salmon oil about 1-8 parts by volume of a scent, taste or pigment component or combination thereof to stimulate a fish to strike at said bait or lure; and
   a plurality of metallic-colored light-reflective particles dispersed in said oil-based liquid in a concentration of about 0.01-1 part by volume and wherein said particles in combination with said oil-based liquid exhibit a controlled buoyancy in water.

2. The liquid fish attractant composition of claim 1 wherein said particles are within a size range of about 50-200 microns.

3. The liquid fish attractant composition of claim 1 wherein said particles are within a size range of about 0.008×0.004×0.0005 inch to 0.008×0.008×0.0005 inch.

4. The liquid fish attractant composition of claim 1 wherein said particles are polyester foil particles.

5. The liquid fish attractant composition of claim 1 wherein said particles are aluminum foil particles.

6. An oil-based liquid fish attractant composition comprising about 90-95 parts by volume of a base liquid including at least one of mineral oil, anise oil, cod liver oil, menhaden oil, herring oil or salmon oil, about 1-8 parts by volume of a scent or taste attractant or pigment, or combination thereof, and a plurality of light-reflective particles in an amount sufficient to create a visual attraction for fish and which, in combination with the base liquid, aids in the controlled dispersion of said base liquid and particles when said composition is applied to a live bait or an artificial lure and placed in water, said light-reflective particles being metallic-colored particles made from coated aluminum foil, polyester or other thermoplastic or thermoset resin materials wherein about 1-4 grams of the light reflective particles are present per 8 ounces of the remaining components.

* * * * *